United States Patent
Kargilis

[11] Patent Number: 6,056,075
[45] Date of Patent: May 2, 2000

[54] HOOD WITH INTEGRATED COOLING DUCT

[75] Inventor: John S. Kargilis, Northville, Mich.

[73] Assignee: DaimlerChrysler Corporation, Auburn Hills, Mich.

[21] Appl. No.: 09/320,185

[22] Filed: May 26, 1999

[51] Int. Cl.[7] .................................................. B60K 11/00
[52] U.S. Cl. ........................................ 180/68.1; 180/69.2
[58] Field of Search ................................ 180/69.2, 68.1, 180/68.2, 68.3, 68.4, 69.25

[56] References Cited

U.S. PATENT DOCUMENTS

| | | | |
|---|---|---|---|
| 4,646,864 | 3/1987 | Racchi | 180/69.22 |
| 5,660,243 | 8/1997 | Anzalone et al. | 180/68.1 |
| 5,794,733 | 8/1998 | Stosel et al. | 180/68.1 |

FOREIGN PATENT DOCUMENTS 378518  6/1940  Italy ...................... 180/68.1

*Primary Examiner*—Richard M. Camby
*Attorney, Agent, or Firm*—Kenneth H. Maclean

[57] ABSTRACT

A hood for closing an engine compartment of an automotive vehicle having at least one component in the compartment which it desired to subject to a flow of cooling air. The hood has an inner panel and an outer panel. The inner panel is shaped to form a channel. The outer panel overlies the channel to form a duct. The duct has an air inlet and an air outlet downstream from the air inlet. During forward motion of the vehicle, air will enter the air inlet and flow through the duct, exiting at the air outlet to subject the component to a flow of cooling air.

10 Claims, 4 Drawing Sheets

HOOD WITH INTEGRATED COOLING DUCT

This invention relates generally to cooling systems for automotive vehicles, and more particularly to an underhood component cooling duct integrated into a vehicle hood assembly.

BACKGROUND AND SUMMARY

The hood on an automobile typically has an inner panel and an outer panel. The inner panel is a structural member formed with ribs or channels to increase the strength of the hood. In accordance with this invention, the inner panel is held tight against the outer panel to cooperate with the channels in forming ducts, and these ducts serve as air passages for transmitting air introduced at the front of the vehicle and expelling the air into the engine compartment over a particular component that needs extra cooling. Thus, the channels not only strengthen the inner panel but have the added function of forming ducts enabling ram air cooling of a desired vehicle component.

Preferably, an air inlet is in a forward portion of a duct. The duct extends rearwardly to a point adjacent to a component to be cooled. Air entering the duct travels rearwardly to an air outlet from which it is discharged. The air flows naturally through the duct during forward motion of the vehicle. Additional ducts, air inlets and outlets may be employed, especially when cooling of more than one component is desired. The air inlets and outlets are formed in the inner panel and therefore are not normally visible.

There is a sealing strip which extends transversely across the inner surface of the inner panel of the hood and engages the radiator of the vehicle rearwardly of the air inlet. The sealing strip ensures that air entering the front of the vehicle will enter the air inlet without by-passing it. Air outlets rearwardly of the sealing strip are located over the components to be cooled. The air outlets may have nozzles, if desired, to direct the air against the components. At the end of a duct beyond an air outlet there may be a blocker to close off the duct and ensure that the air in the duct exits where desired through the air outlet and is not dissipated. There may be lateral ducts which lead to other components. There may also be lateral ducts which do not lead to a component needing cooling, and these should be blocked off.

This invention solves the problem of providing ram air cooling of underhood components without the need of adding a separate dedicated cooling duct. Thus additional parts are unnecessary. In addition to the obvious advantage of parts reduction, there are the benefits of warranty reduction, cost reduction, labor reduction and weight reduction. Moreover, providing a cooling duct within the existing hood structure does not occupy any underhood space as would be required by a dedicated cooling duct, thus simplifying underhood packaging and design.

One object of this invention is to provide a hood with an integrated cooling duct having the foregoing features and capabilities.

Another object is to provide a hood with an integrated cooling duct which is of relatively simple construction and design, requires few if any additional parts, and is easy to manufacture and assemble.

These and other objects, features and advantages of the invention will become more apparent as the following description proceeds, especially when taken with the accompanying drawings.

DETAILED DESCRIPTION OF THE PREFERRED EMBODIMENT

Figure 1:
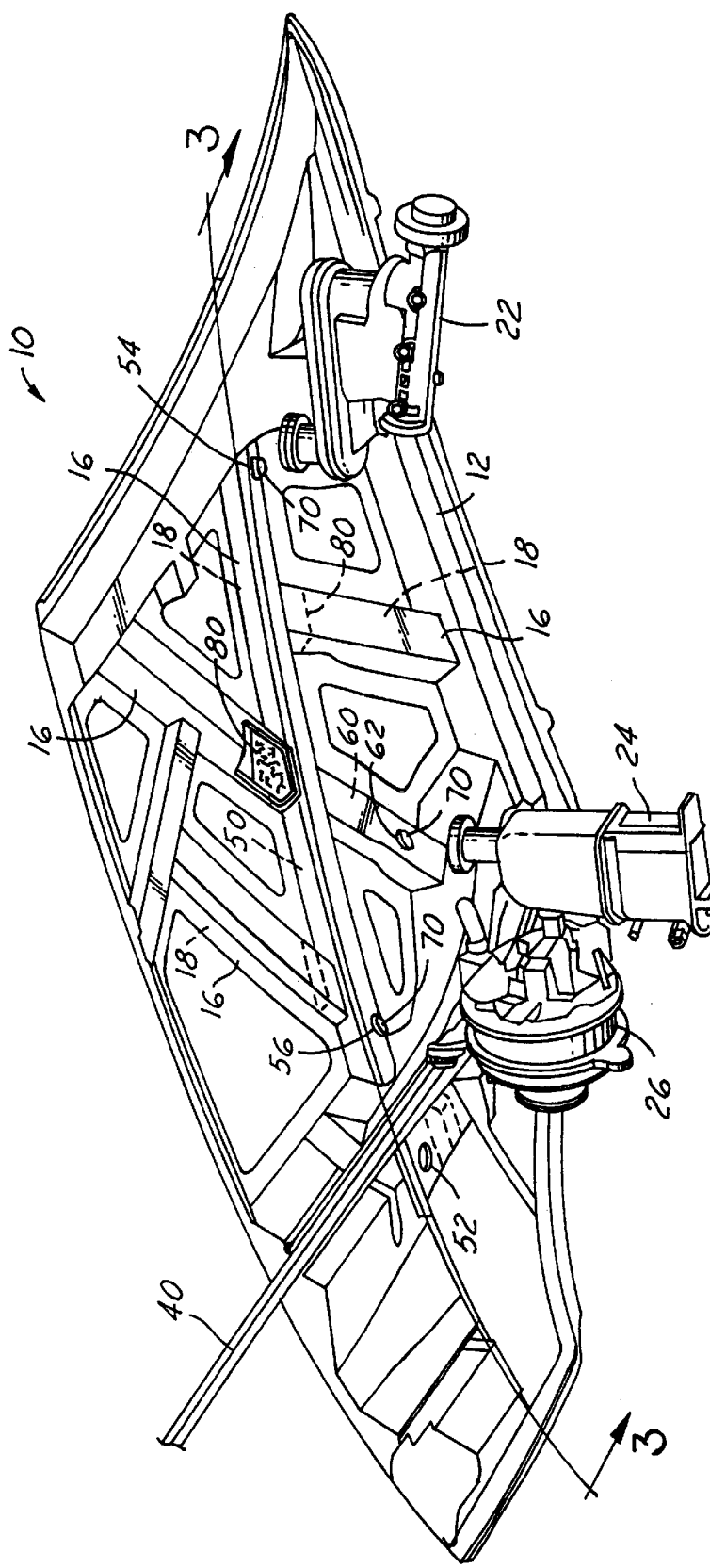
FIG. 1 is a bottom perspective view of approximately one half of the hood of an automotive vehicle, the other half of the hood being a mirror image of that shown. This figure also shows certain underhood components in the engine compartment of the vehicle.

Referring now more particularly to the drawings, the hood 10 is shown as having an inner panel 12 and an outer panel 14 overlying the inner panel. The inner and outer panels are secured together by any suitable means and preferably are substantially co-extensive with one another.

The inner panel 12 is shaped or configured to provide channels 16 which contribute to the overall strength of the hood. The overlying outer panel engages the inner panel and closes the channels to provide ducts 18. The outer panel provides a smooth, continuous surface and conceals the inner panel when the hood is closed and viewed from the outside.

The hood serves as a lid to close the engine compartment 20 of an automotive vehicle. Within the engine compartment 20 are a plurality of underhood components including a brake fluid reservoir 22, a power steering fluid reservoir 24 and an alternator assembly 26. These components are not attached to the hood but are mounted in fixed position within the engine compartment under the hood.

The front 30 of the vehicle has an opening to admit air to a radiator 32 positioned behind the opening 30. Secured to the inner panel 12 of the hood is an elongated sealing strip 40. The sealing strip 40 extends transversely of the hood and is adapted to press and seal against an upper transverse surface portion 42 of the radiator. The seal provided by the sealing strip 40 causes incoming air at the front of the vehicle to enter the air inlet 52, described below, without by-passing it.

Figure 3:
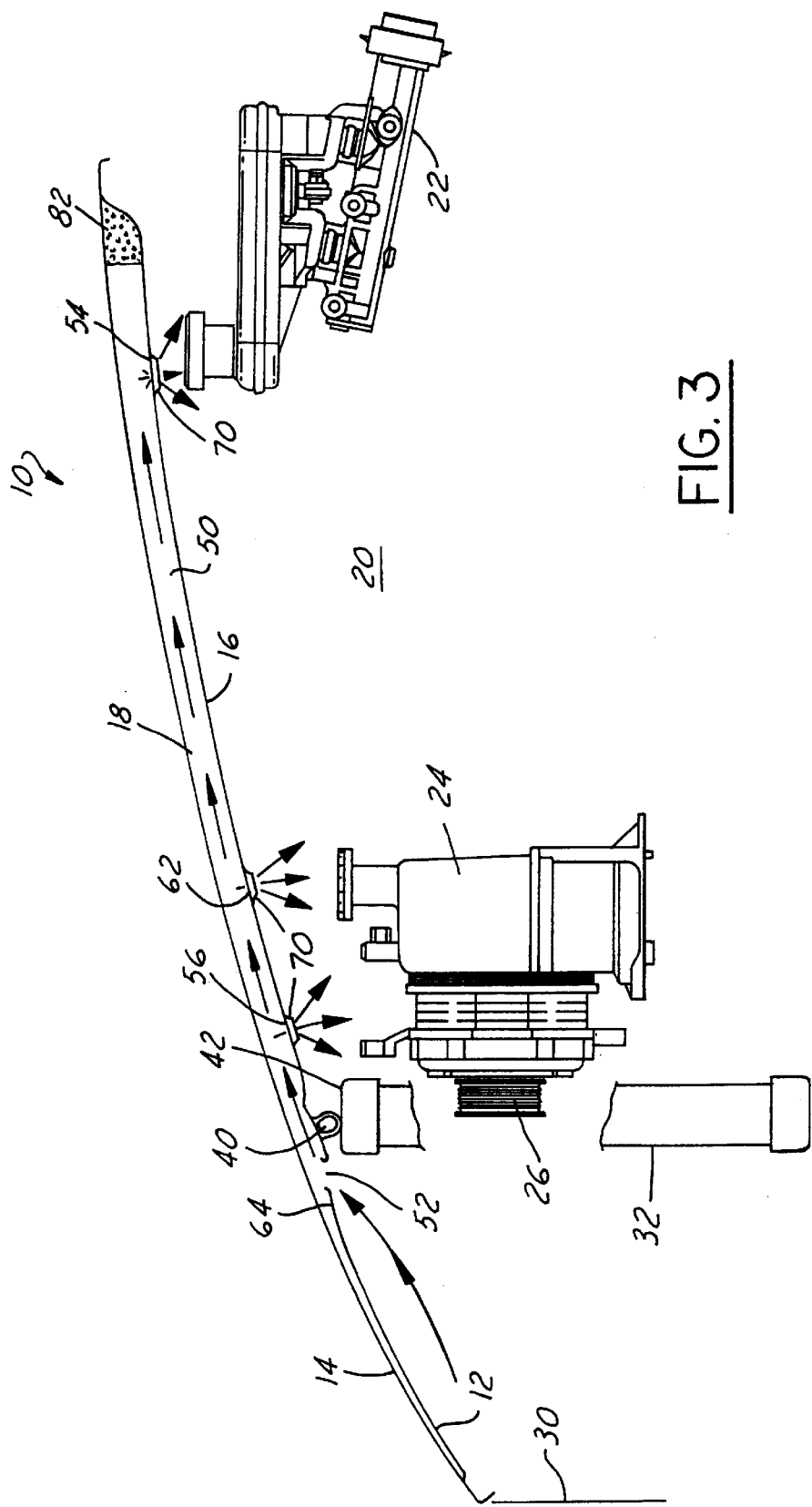
FIG. 3 is a semi-diagrammatic view, taken on the line 3—3 in FIG. 1, showing a duct for directing air to underhood components requiring ram air cooling.

One of the ducts is designed 50 and extends generally longitudinally of the hood, that is from front to rear. An air inlet 52 to the duct 50 is formed in the inner panel at a point forwardly of the sealing strip 40. Air is adapted to enter the duct 50 through the air inlet 52 and travel downstream as best seen in FIG. 3. At a point in the duct 50 adjacent to the brake fluid reservoir 22, there is formed in the inner panel an air outlet 54 from the duct 50 to direct or discharge air from the duct against the brake fluid reservoir. There is a second air outlet 56 from duct 50 formed in the inner panel at a point adjacent to the alternator assembly 26 for directing cooling air against the alternator assembly. Another of the-ducts is a branch or lateral duct 60 communicating with and extending laterally from the longitudinally extending duct 50 leading to a point adjacent the power steering fluid reservoir 24. A third air outlet 62 from duct 60 formed in the inner panel at this point directs cooling air against the power steering fluid reservoir.

When the vehicle moves in a forward direction, air naturally enters the air inlet 52 and flows downstream from the inlet, to be discharged from the air outlets to provide ram air cooling for adjacent components within the engine compartment. Entry of air into the air inlet 52 is facilitated by the fact that the inner end portion 64 of the bottom wall of the duct 50 is slanted somewhat toward the front of the hood (see FIG. 3).

The air inlet 52 and all of the air outlets 54, 56 and 62 are formed in the inner panel 12 of the hood so as not to be visible when the hood is closed.

Associated with the air outlets may be nozzles 70 for directing the air discharged in the desired direction for maximum cooling effect of the components to be cooled. These nozzles may be adjustable to alter the direction of discharge.

Figure 2:
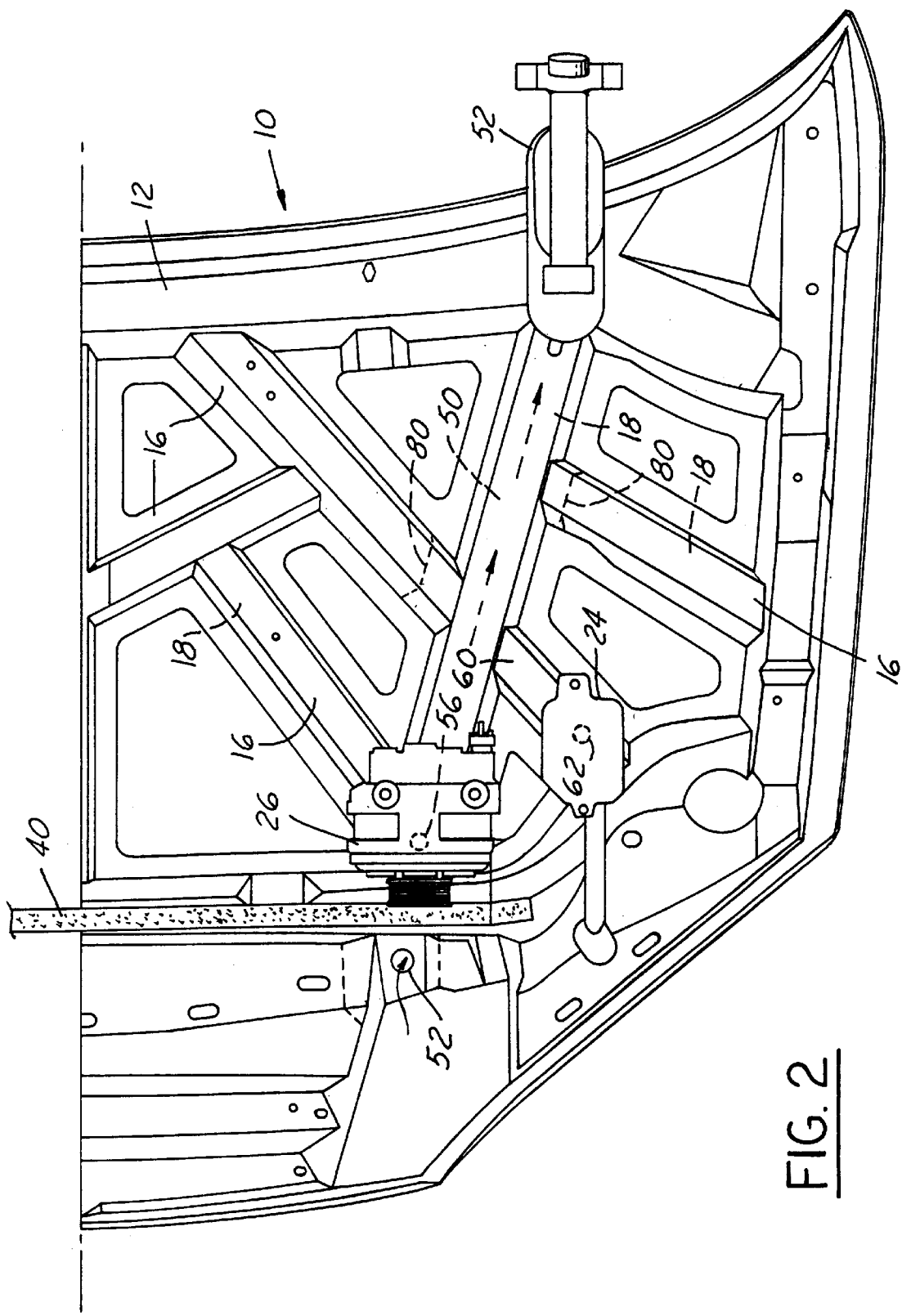
FIG. 2 is a bottom plan view of the structure shown in FIG. 1.
Figure 4:
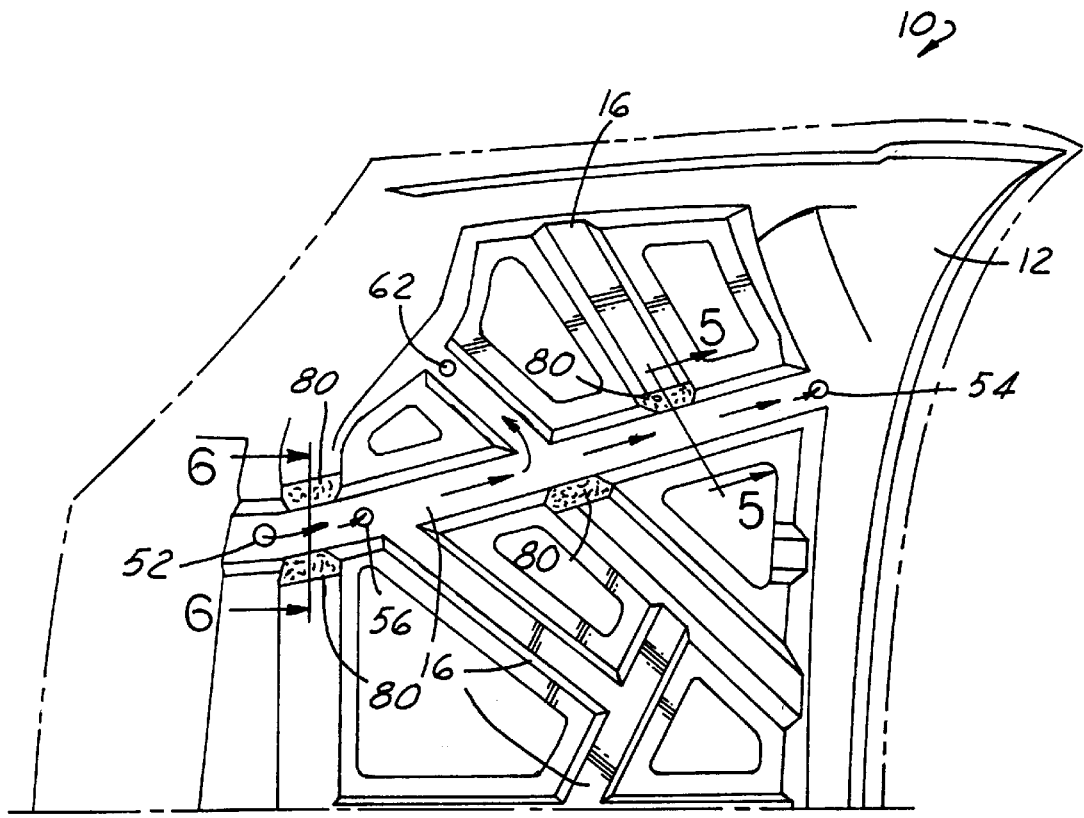
FIG. 4 is a top plan view of one half of the hood, with the outer panel of the hood removed to better illustrate the inner panel.
Figure 5:
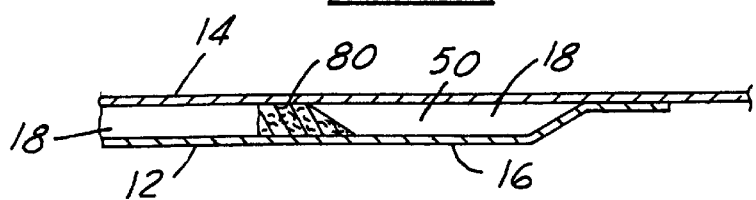
FIG. 5 is a sectional view taken on the line 5—5 in FIG. 4.
Figure 6:
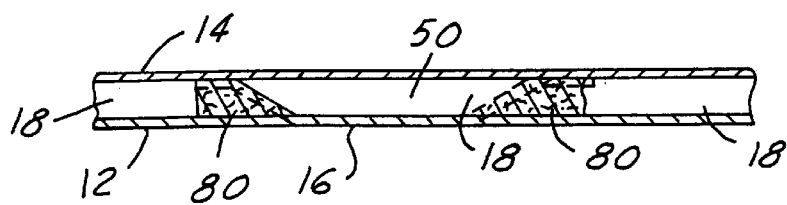
FIG. 6 is a sectional view taken on the line 6—6 in FIG. 4.

As seen in FIGS. 1, 2 and 4 of the drawings, there are several other branch or lateral ducts leading from the main duct 50. In the event that these branch ducts do not lead to a point adjacent a component desired to be cooled, they will be sealed off from the main duct 50 by blockers 80 so as not to dissipate air needed for specific cooling purposes of designated components. There is also a blocker 82 at the rear end of the main duct 50 beyond the air outlet 54 to ensure that a maximum flow of air is discharged where needed.

Additional ducts similar to duct 50, with suitable air inlets and outlets, may be provided if desired.

What is claimed is:

1. A lid for closing a compartment of an automotive vehicle having at least one component in the compartment which it is desired to subject to a flow of cooling air, said lid comprising:

an inner panel, an outer panel extending over said inner panel, said panels cooperating with one another to form a duct, said duct leading rearwardly from a forward portion thereof to a point adjacent to the component, an air inlet into the forward portion of said duct extending through said inner panel, and an air outlet from said duct downstream of said air inlet extending through said inner panel at the point adjacent to the component, whereby, during forward motion of the vehicle, air entering the air inlet will flow through the duct and exit at the air outlet to subject the component to a flow of cooling air.

2. A lid as defined in claim 1, further including a nozzle at said air outlet to direct air from said air outlet toward the component.

3. A lid as defined in claim 1, wherein said inner panel is shaped to form a channel, and said outer panel has a portion overlying said channel to cooperate therewith in the formation of said duct.

4. A lid as defined in claim 1, further including means downstream from said air outlet for blocking further downstream flow of air.

5. A hood for closing an engine compartment of an automotive vehicle having at least one component in the engine compartment which it is desired to subject to a flow of cooling air, said hood comprising:

an inner panel, an outer panel extending over said inner panel, said inner panel being shaped to form an elongated channel, said outer panel having a portion overlying said channel to form an elongated duct, said duct leading rearwardly from a forward portion thereof to a point adjacent to the component, an air inlet into the forward portion of said duct extending through said inner panel, and an air outlet from said duct downstream of said air inlet extending through said inner panel at the point adjacent to the component, whereby, during forward motion of the vehicle, air entering the air inlet will flow through the duct and exit at the air outlet to subject the component to a flow of cooling air.

6. A hood as defined in claim 5, further including a nozzle at said air outlet to direct air from said air outlet toward the component.

7. A hood as defined in claim 5, further including a branch formed by another channel of the inner panel and another portion of the outer panel, said branch duct being in communication with and leading from said elongated duct, and a second air outlet in said branch duct extending through said inner panel to discharge a flow of cooling air toward a second component in the engine compartment.

8. A hood as defined in claim 7, further including a first blocker in said elongated duct downstream of said first-mentioned air outlet to block further downstream flow of air, and a second blocker in said branch duct downstream of said second air outlet to block further downstream flow of air.

9. A hood as defined in claim 8, further including first and second nozzles at said respective air outlets to direct air from said outlets toward the components, said nozzles being adjustable to enable altering the direction of air discharged therefrom.

10. A hood as defined in claim 9, further including a sealing strip secured to the inner panel of said hood and extending transversely thereof rearwardly of said air inlet and forwardly of said air outlets to cause incoming air at the front of the vehicle to enter the air inlet without by-passing it.

* * * * *